(12) United States Patent
Jeon (10) Patent No.: US 8,379,149 B2
(45) Date of Patent: Feb. 19, 2013

(54) DISPLAY APPARATUS AND CONTROL METHOD THEREOF

(75) Inventor: Joo-hee Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1539 days.

(21) Appl. No.: 11/866,442

(22) Filed: Oct. 3, 2007

(65) Prior Publication Data

US 2008/0129869 A1 Jun. 5, 2008

(30) Foreign Application Priority Data

Oct. 31, 2006 (KR) ........................ 10-2006-0106954

(51) Int. Cl.
*H04N 7/00* (2006.01)
*H04N 5/04* (2006.01)
*H04N 9/475* (2006.01)
*H04N 5/06* (2006.01)
*H04N 5/067* (2006.01)
*H04N 5/202* (2006.01)
*H04N 5/57* (2006.01)
*H04N 5/08* (2006.01)
*H04N 5/14* (2006.01)
*H04N 5/72* (2006.01)
*H04N 5/18* (2006.01)
*H04N 5/16* (2006.01)
*H03L 7/00* (2006.01)

(52) U.S. Cl. ........ 348/500; 348/497; 348/516; 348/521; 348/522; 348/540; 348/677; 348/687; 348/688; 348/689; 348/690; 348/691; 348/692; 348/693; 348/694; 348/695; 348/696; 348/697

(58) Field of Classification Search .................. 348/479, 348/500, 516, 521, 522, 540, 677, 687–697
See application file for complete search history.

(56) References Cited

U.S. PATENT DOCUMENTS

| | | | |
|---|---|---|---|
| 5,864,371 A | 1/1999 | Nayebi et al. | |
| 5,905,396 A * | 5/1999 | Nishiyama | 327/291 |
| 6,259,483 B1 * | 7/2001 | Jiang et al. | 348/511 |
| 6,404,974 B1 | 6/2002 | Franklin | |
| 2002/0044220 A1 * | 4/2002 | Lee | 348/531 |
| 2002/0145618 A1 * | 10/2002 | Okuno et al. | 345/660 |
| 2006/0093140 A1 * | 5/2006 | Quan | 380/201 |
| 2006/0114275 A1 | 6/2006 | Kim et al. | |

FOREIGN PATENT DOCUMENTS

| | | |
|---|---|---|
| CN | 1181156 A | 5/1998 |
| CN | 1348306 A | 5/2002 |

(Continued)

*Primary Examiner* — Nasser Goodarzi
*Assistant Examiner* — Kyu Chae
(74) *Attorney, Agent, or Firm* — Sughrue Mion, PLLC (57) ABSTRACT

A display apparatus includes a signal input unit through which an image signal is input, the image signal comprising a synchronization signal and an active signal; an adjustment signal generating unit that generates an adjustment signal; a signal processing unit that receives the adjustment signal and adjusts the image signal based on the received adjustment signal; and a controller which analyzes the input signal and controls the adjustment signal generating unit to change characteristics of the adjustment signal if the adjustment signal does not lie within a blanking interval between the synchronization signal and the active signal. With this configuration, even when an image signal having a reduced blanking interval between the synchronization signal and the active signal is input, the adjustment signal can be generated within the blanking interval of the image signal, not within the active signal interval.

14 Claims, 5 Drawing Sheets

FOREIGN PATENT DOCUMENTS

| | | |
|---|---|---|
| JP | 63-191492 A | 8/1988 |
| JP | 7-87358 A | 3/1995 |
| JP | 7-203245 A | 8/1995 |
| JP | 8-65695 A | 3/1996 |
| JP | 9-83433 A | 3/1997 |
| KR | 20-1992-14181 U | 7/1992 |
| KR | 10-1997-0004633 A | 1/1997 |

* cited by examiner

ND CONTROL
DISPLAY APPARATUS AND CONTROL METHOD THEREOF

CROSS-REFERENCE TO RELATED APPLICATIONS

This application claims priority from Korean Patent Application No. 10-2006-0106954, filed on Oct. 31, 2006 in the Korean Intellectual Property Office, the disclosure of which is incorporated herein by reference.

BACKGROUND OF INVENTION

1. Field of Invention

Apparatuses and methods consistent with the present invention relate to adjusting position and size of an image signal using a clamp signal.

2. Description of the Related Art

In general, an image signal includes an active signal to be actually displayed on a screen of a display apparatus and a synchronization signal defining a starting point and an end point of the active signal. The image signal is provided to a signal processing unit of the display apparatus, and the signal processing unit processes the provided image signal so that an image can be displayed on the screen. At this time, an adjustment signal to adjust position and size of the active signal displayed on the screen requires, for example, a reference signal such as a clamp signal formed in a blanking interval between the synchronization signal and the active signal. Resolution and size of the screen on which the active signal is displayed may be adjusted based on the adjustment signal.

In the related art, even if an image signal with high resolution, such as a digital video interactive (DVI) signal having a pixel clock of more than 150 MHz, is input in the display apparatus, the display apparatus can not support such a high frequency. To overcome this problem, the display apparatus has to process an image signal having a reduced blanking timing.

However, when the reduced blanking timing image signal is input to the display apparatus, since the display apparatus processes the input image signal according to a signal processing standard with an existing blanking timing, there arises a problem in that the clamp signal is included in an interval of the active signal, thereby darkening and trembling an image.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus which is capable of processing a reduced blanking timing image signal stably by precisely detecting a blanking interval of the image signal and adjusting position and pulse width of a clamp signal, which is an adjustment signal for adjustment of the image signal, and a control method thereof.

According to an aspect of the present invention, there is provided a display apparatus comprising: a signal input unit through which an image signal is input, the image signal comprising a synchronization signal and an active signal; an adjustment signal generating unit that generates an adjustment signal; a signal processing unit that receives the adjustment signal and adjusts the image signal based on the adjustment signal; and a controller which analyzes the input signal and controls the adjustment signal generating unit to adjust characteristics of the adjustment signal if the controller determines that at least a portion of the adjustment signal would not lie within a blanking interval between the synchronization signal and the active signal.

The controller may control the adjustment signal generating unit to change a generation timing of the adjustment signal to a previous timing if at least a portion of the adjustment signal would not lie within the blanking interval.

The controller may control the adjustment signal generating unit to generate the adjustment signal after a predetermined delay time elapses from a rising edge of the synchronization signal if at least a portion of the adjustment signal would not lie within the blanking interval.

The controller may control the adjustment signal generating unit to reduce a pulse width of the adjustment signal if at least a portion of the adjustment signal would not lie within the blanking interval.

According to another aspect of the present invention, there is provided a control method of a display apparatus, the control method comprising: receiving an image signal comprising a synchronization signal and an active signal; checking a position of the synchronization and a position of the active signal; adjusting characteristics of an adjustment signal if at least a portion of the adjustment signal would not lie within a blanking interval between the position of the synchronization signal and the position of the active signal; and generating the adjustment signal having the adjusted characteristics within a blanking interval between the synchronization signal and the active signal.

The adjusting the characteristics of the adjustment signal may comprise moving a generation timing of the adjustment signal to a previous timing if at least a portion of the adjustment signal would not lie within a blanking interval between the position of the synchronization signal and the position of the active signal.

The adjusting the characteristics of the adjustment signal may comprise generating the adjustment signal after a predetermined delay time elapses from a rising edge of the synchronization signal if at least a portion of the adjustment signal would not lie within a blanking interval between the position of the synchronization signal and the position of the active signal.

The adjusting the characteristics of the adjustment signal may comprise reducing pulse width of the adjustment signal by half signal if at least a portion of the adjustment signal would not lie within a blanking interval between the position of the synchronization signal and the position of the active signal.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Reference will now be made in detail to the embodiments of the present invention, examples of which are illustrated in the accompanying drawings.

Figure 1:
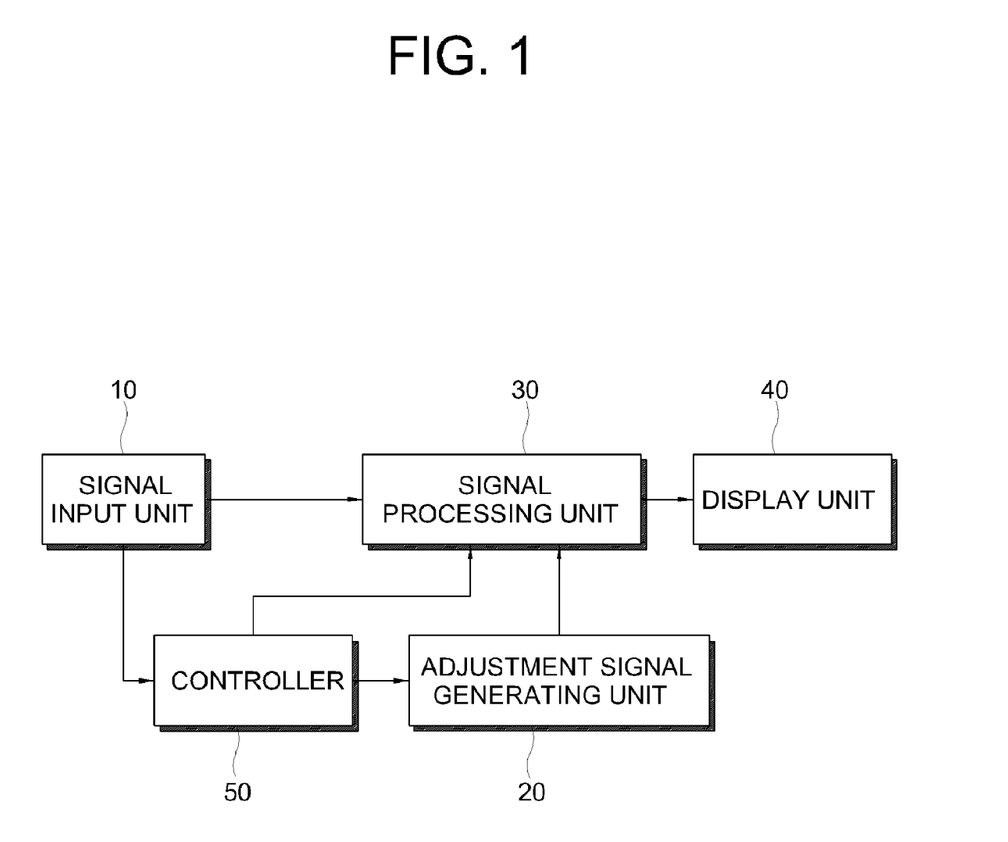
FIG. 1 is a block diagram of a display apparatus according to an exemplary embodiment of the present invention.

As shown in FIG. 1, a display apparatus according to an exemplary embodiment of the present invention comprises a signal input unit 10, an adjustment signal generating unit 20, a signal processing unit 30, a display unit 40, and a controller 50 that controls the signal input unit 10, the adjustment signal generating unit 20, the signal processing unit 30, and the display unit 40.

The signal input unit 10 which receives an image signal and a synchronization signal. The signal input unit 10 may comprise a tuner (not shown) that receives a broadcasting signal and an external connecting terminal (not shown) that receives an image signal from an external apparatus.

The external connecting terminal (not shown) may comprise various types of connectors through which image signals of various formats can be input. For example, the external connecting terminal may comprise at least one of a D-sub connector, a composite video baseband signal (CVBS) connector, a S-video connector and a component connector that receive the image signal.

The adjustment signal generating unit 20 generates an adjustment signal that adjusts a position and a size of an active signal of the input image signal, which is to be displayed on the display unit 40 of the display apparatus. The adjustment signal is a signal acting as a reference based on which the active signal is processed. The active signal is input after a predetermined delay time elapses from a timing at which the adjustment signal is generated.

In this exemplary embodiment, the adjustment signal is a clamp signal and is generated in a blanking interval of the image signal. The blanking interval may be, for example, a back porch interval between a horizontal synchronization signal (HSync) and the active signal to be displayed on the display unit 40.

In addition, the adjustment signal generating unit 20 generates the adjustment signal after a predetermined delay time elapses from a particular point of time of the horizontal synchronization signal under control of the controller 50, which will be described later.

On the other hand, the adjustment signal generating unit 20 may be provided in an analog-to-digital (A/D) converter that converts input analog image signals of various formats into a digital image signal of a specified format.

The signal processing unit 30 processes the image signal input from the signal input unit 10 and provides the processed image signal to the display unit 40 under control of the controller 50. The image signal processed by the signal processing unit 30 can be adjusted with its position and size.

Accordingly, the signal processing unit 30 may include various functions corresponding to various formats of the input image signal. For example, the signal processing unit 30 may include a digital decoding function, a scaling function of adjusting a vertical frequency, resolution, a picture aspect ratio, etc. of a digital image signal and/or an analog image signal to meet an output format of the display unit 40, a format converting function, etc.

The display unit 40 displays an image based on the image signal processed by the signal processing unit 30, and may be embodied by various types of display devices such as a digital light processing (DLP) device, a liquid crystal display (LCD), a plasma display panel (PDP) and the like.

The controller 50 analyzes the input image signal to determine whether the adjustment signal would be generated in the blank interval of the input image signal. Specifically, the controller 50 checks the blanking interval between the horizontal synchronization signal and the active signal and checks a delay time elapsed from the horizontal synchronization signal to the time when the adjustment signal would be generated.

Figure 2:
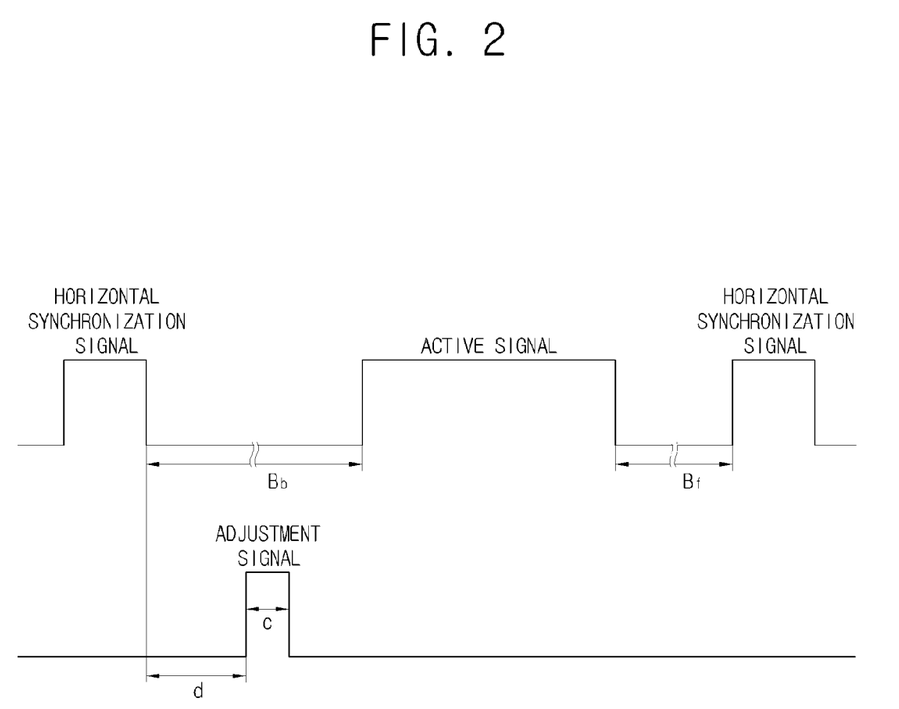
FIG. 2 is a diagram showing waveforms of an image signal having a typical blanking timing with an adjustment signal.

In general, as shown in FIG. 2, the image signal comprises the horizontal synchronization signal, which is a pulse signal having a predetermined pulse width, and the active signal, and has a blanking interval Bb between the horizontal synchronization signal and the active signal. The controller 50 controls the adjustment signal generating unit 20 to generate the adjustment signal having a pulse width c at a position distant by a predetermined distance d from a falling edge of the horizontal synchronization signal in order to adjust the position and size of the image signal.

For example, in case of an image signal having a typical blanking time, an image signal having 1680×1050 pixel resolution has the total of 2240 pixel timings per cycle, the blanking timing (H back porch) between the horizontal synchronization signal and the active signal has 280 pixel timings, the horizontal synchronization signal has 176 pixel timings, an H front porch interval between the active signal and the next horizontal synchronization signal has 104 pixel timings, and the active signal has 1680 pixel timings.

Figure 3A:
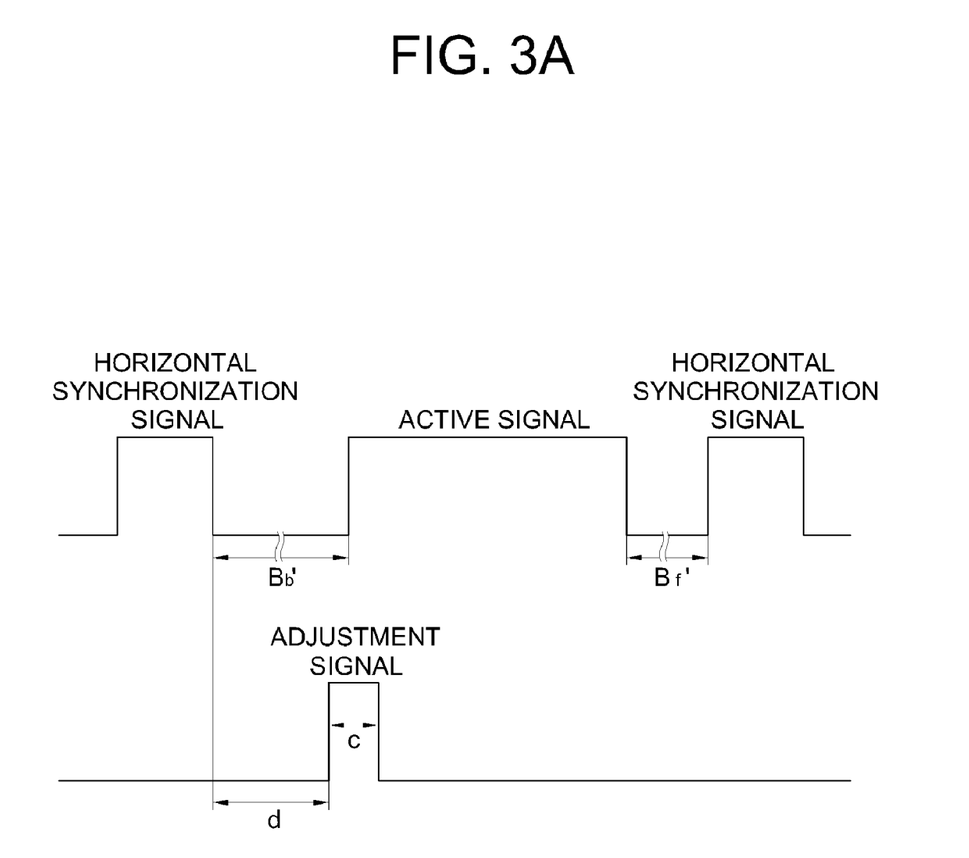
FIG. 3A is a diagram showing waveforms of an image signal having a reduced blanking timing and an adjustment signal according to an exemplary embodiment of the present invention.

In the case shown in FIG. 3A, when an image signal with a reduced blanking timing Bb' is input, the adjustment signal generated at a position distant by a delay distance d from the horizontal synchronization signal lies at least partially within (i.e., overlaps) an active signal interval. In this case, for example, the image signal has the total of 1840 pixel timings per cycle, the blanking timing (H back porch Bb') between the horizontal synchronization signal and the active signal has 80 pixel timings, the horizontal synchronization (HSync) signal has 32 pixel timings, the H front porch Bf' interval between the active signal and the next horizontal synchronization signal has 48 pixel timings, and the active signal has 1680 pixel timings.

Figure 3B:
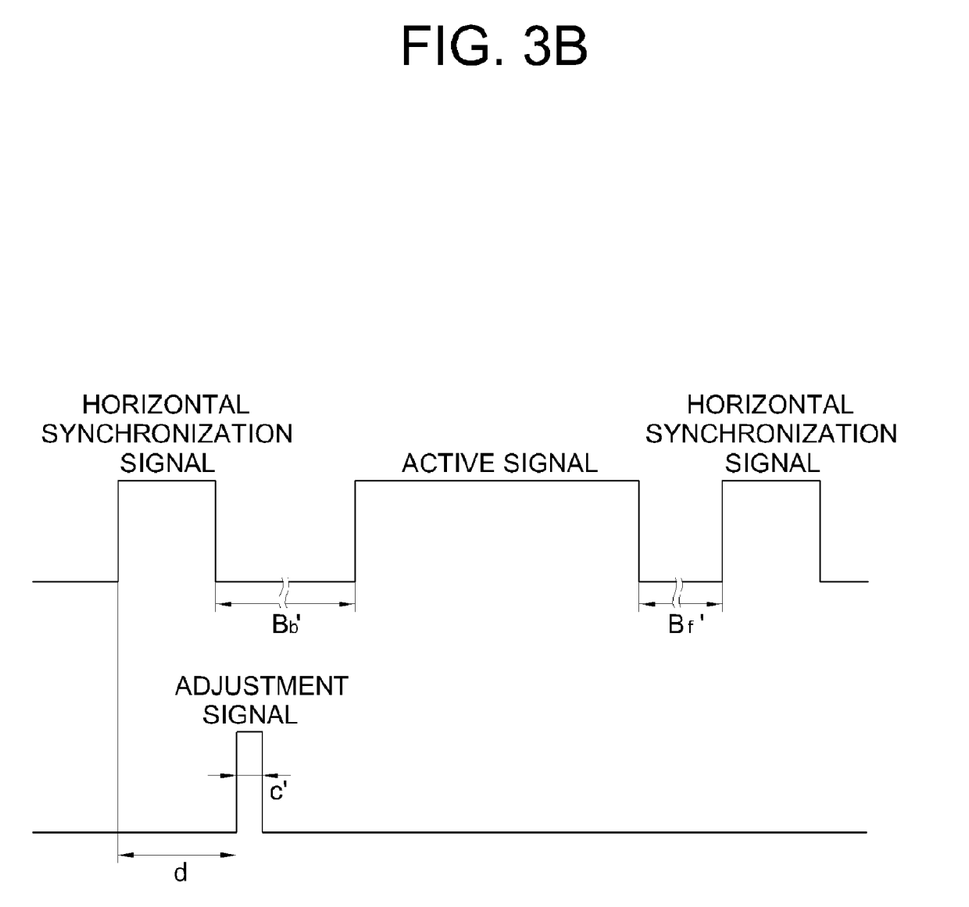
FIG. 3B is a diagram showing waveforms of an image signal having a reduced blanking timing and an adjustment signal according to an exemplary embodiment of the present invention.

Accordingly, when the image signal having the reduced blanking timing Bb' of 80 pixels is input, if the controller 50 determines that the adjustment signal generated time delayed by distance d from the falling edge of the horizontal synchronization signal would lie at least partially within the active signal interval out of the blanking interval, the controller 50 controls the adjustment signal generating unit 20 to reduce the pulse width of the adjustment signal by half. Further, the controller 50 changes a reference of the generation timing of the adjustment signal from the falling edge to a rising edge of the horizontal synchronization signal. Accordingly, as shown in FIG. 3B the adjustment signal generating unit 20 generates a new adjustment signal that has a reduced pulse width c' and is distant by a changed delay distance d from the rising edge of the horizontal synchronization signal. This new adjustment signal lies within the reduced blanking interval.

Then, the controller 50 controls the signal processing unit 30 to adjust the size and position of the image signal based on the newly generated adjustment signal.

Hereinafter, an operation of the display apparatus according to an exemplary embodiment of the present invention will be described in detail with reference to FIG. 4.

Figure 4:
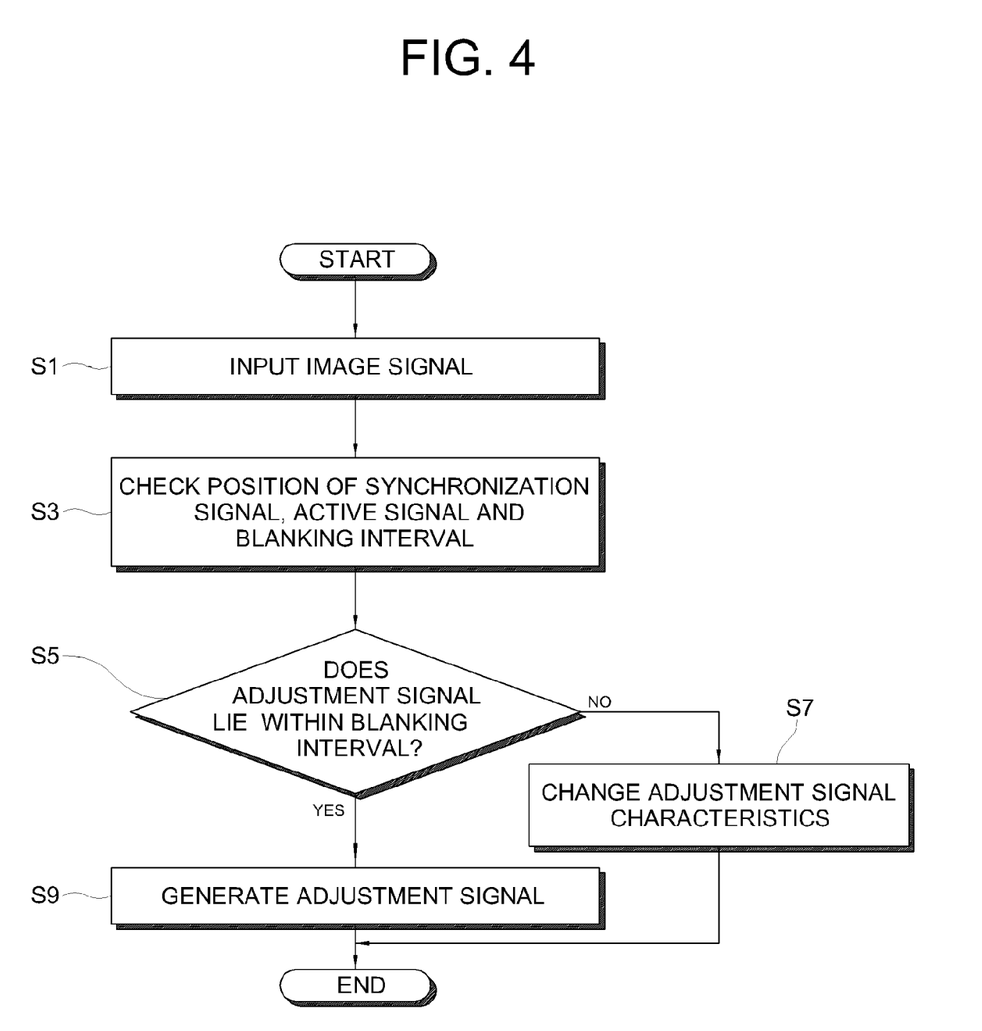
FIG. 4 is a flow chart illustrating an operation of a display apparatus according to an exemplary embodiment of the present invention.

As shown in FIG. 4, first, the image signal including the horizontal synchronization signal and the active signal to be displayed on the display unit 40 are input through the signal input unit 10 at operation S1.

Then, the controller 50 checks positions of the horizontal synchronization signal, the active signal and the blanking interval at operation S3.

Next, the controller 50 compares a timing at which the adjustment signal generating unit 20 generates the adjustment signal with the blanking timing, and checks whether the adjustment signal would lie completely within the blanking interval at operation S5. If it is determined that the adjustment signal would not lie completely within the blanking interval, in other words, the adjustment signal would lie at least partially within the active signal interval or the adjustment signal is overlapped with the active signal interval, the controller controls the adjustment signal generating unit 20 to adjust the adjustment signal at operation S7.

Specifically, in operation S7, the controller 50 changes the reference of the generation timing of the adjustment signal from the falling edge to the rising edge of the horizontal synchronization signal, and controls the adjustment signal generating unit 20 to reduce the pulse width of the adjustment signal to lie completely within the blanking interval. For example, the controller 50 controls the adjustment signal generating unit 20 to reduce the pulse width of the adjustment signal by half.

Accordingly, the adjustment signal generating unit 20 generates a new adjustment signal at operation S9 that has changed pulse width and is distant by a changed delay distance from the changed reference, which is the rising edge of the horizontal synchronization signal.

As described above, the present invention provides a display apparatus which is capable of processing a reduced blanking timing image signal stably by precisely detecting a blanking interval of the image signal and adjusting position and pulse width of a clamp signal, which is an adjustment signal for adjustment of the image signal, and a control method thereof. Accordingly, the clamp signal may be generated within the blanking interval of the image signal, not within the active signal interval, thereby preventing any distortion or noises from occurring in an image.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
 a signal input unit through which an image signal is input, the image signal comprising a horizontal synchronization signal and an active signal;
 an adjustment signal generating unit that generates an adjustment signal;
 a signal processing unit that receives the adjustment signal and adjusts the image signal based on the adjustment signal; and
 a controller which analyzes the input signal and controls the adjustment signal generating unit to adjust characteristics of the adjustment signal if the controller determines that at least a portion of the adjustment signal would not lie within a blanking interval between the horizontal synchronization signal and the active signal, wherein the controller changes a reference of time for generating the adjustment signal from a falling edge of the horizontal synchronization signal to a rising edge of the horizontal synchronization signal if the controller determines that at least the portion of the adjustment signal would not lie within the blanking interval between the horizontal synchronization signal and the active signal.

2. The display apparatus according to claim 1, wherein the controller controls the adjustment signal generating unit to change a generation timing of the adjustment signal to a previous timing if at least a portion of the adjustment signal would not lie within the blanking interval.

3. The display apparatus according to claim 2, wherein the controller controls the adjustment signal generating unit to generate the adjustment signal after a predetermined delay time elapses from a rising edge of the horizontal synchronization signal if at least a portion of the adjustment signal would not lie within the blanking interval.

4. The display apparatus according to claim 3, wherein the controller controls the adjustment signal generating unit to reduce a pulse width of the adjustment signal if the adjustment signal would not lie completely within the blanking interval.

5. The display apparatus according to claim 1, wherein the controller compares a timing at which the adjustment signal generating unit generates the adjustment signal with a timing of the blanking interval.

6. A control method of a display apparatus, the control method comprising:
 receiving an image signal comprising a horizontal synchronization signal and an active signal;
 checking a position of the horizontal synchronization signal and a position of the active signal;
 adjusting characteristics of an adjustment signal if at least a portion of the adjustment signal would not lie within a blanking interval between the position of the horizontal synchronization signal and the position of the active signal; and
 generating the adjustment signal having the adjusted characteristics within a blanking interval between the horizontal synchronization signal and the active signal,
 wherein the adjusting the characteristics of the adjustment signal comprises changing a reference of time for generating the adjustment signal from a falling edge of the horizontal synchronization signal to a rising edge of the horizontal synchronization signal if at least the portion of the adjustment signal would not lie within the blanking interval between the position of the horizontal synchronization signal and the position of the active signal.

7. The control method according to claim 5, wherein the adjusting the characteristics of the adjustment signal comprises moving a generation timing of the adjustment signal to a previous timing if at least a portion of the adjustment signal would not lie within a blanking interval between the position of the horizontal synchronization signal and the position of the active signal.

8. The control method according to claim 6, wherein the adjusting the characteristics of the adjustment signal comprises generating the adjustment signal after a predetermined delay time elapses from a rising edge of the horizontal synchronization signal if at least a portion of the adjustment signal would not lie within a blanking interval between the position of the horizontal synchronization signal and the position of the active signal.

9. The control method according to claim 7, wherein the adjusting the characteristics of the adjustment signal comprises reducing pulse width of the adjustment signal by half if the adjustment signal would not lie completely within a blanking interval between the position of the horizontal synchronization signal and the position of the active signal.

10. The control method according to claim 5, wherein the adjusting the characteristics of the adjustment signal comprises comparing a timing at which the adjustment signal is generated with a timing of the blanking interval.

11. The display apparatus according to claim 1, wherein the controller determines whether the entire adjustment signal would lie within the blanking interval.

12. The control method according to claim 6, wherein the adjusting the characteristics of the adjustment signal comprises determines whether the entire adjustment signal would lie within the blanking interval.

13. The display apparatus according to claim 1, wherein the controller determines whether the adjustment signal overlaps the active signal.

14. The control method according to claim 6, wherein the adjusting the characteristics of the adjustment signal comprises determining whether the adjustment signal overlaps the active signal.

* * * * *